Jan. 14, 1969  D. F. DIMON  3,421,375
TEMPERATURE MEASUREMENT SYSTEM
Filed Aug. 31, 1965  Sheet 1 of 2

DIODE EQUIVALENT CIRCUIT

*INVENTOR.*
DONALD F. DIMON

INVENTOR
DONALD F. DIMON

United States Patent Office 3,421,375
Patented Jan. 14, 1969

3,421,375
TEMPERATURE MEASUREMENT SYSTEM
Donald F. Dimon, Los Angeles, Calif., assignor to Infinite Q Corporation, Pittsburgh, Pa., a corporation of Delaware
Filed Aug. 31, 1965, Ser. No. 483,957
U.S. Cl. 73—362    6 Claims
Int. Cl. G01k 5/18; 5/52

ABSTRACT OF THE DISCLOSURE

A temperature measuring bridge circuit having a semiconductor diode as one arm. The junction resistance of the diode varies linearly with both temperature and current. A low frequency A.C. signal of sufficiently small amplitude as not to drive the diode into a rectifying mode is impressed across the bridge, and the unbalanced bridge output is used to vary the bias on the diode and rebalance the bridge.

---

This invention relates to temperature measuring systems and more particularly to a novel and useful precision temperature measuring system having an absolute calibration depending solely upon physical constants.

This invention utilizes the inherent physics of a semiconductor junction to measure temperature, and thereby achieves great accuracy and linearity over wide temperature changes. Since semiconductors may be manufactured in small physical sizes, this invention achieves exact measurements of temperature at very small points.

Some of the objects and advantages of this invention are as follows:

(1) It is an object of this invention to measure temperature accurately at very small points.

(2) It is also an object of this invention to develop an output signal linearly related to temperature.

(3) It is a further object of this invention to measure temperature absolutely against physical constants, without any particular need for calibration.

Other objects and advantages of this invention will become apparent from the described embodiments and from the illustrated drawings in which.

Figure 1:
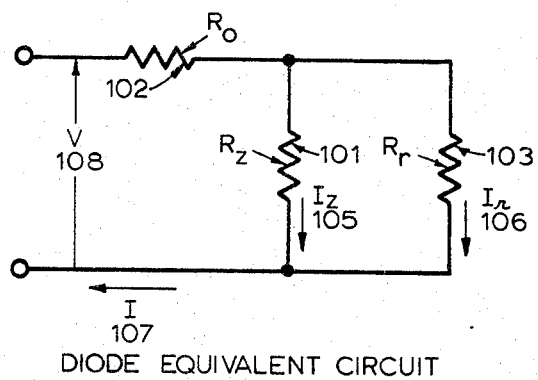
FIGURE 1 illustrates the equivalent circuit for a diode at low frequencies, as used in accordance with this invention.

The impedance properties of a semiconductor are directly related to current and temperature and relatively unrelated to other properties. This property of semiconductors is used in this invention for temperature sensing. A brief analysis of this semiconductor property as used herein is given as follows:

Reference is made to FIGURE 1 which shows an equivalent circuit for a diode. Here, R 102 is shown in series with the parallel pair, $R_z$ 101 and $R_r$ 103. $R_o$ 102 is the small ohmic resistance, being ordinarily of the value of a few ohms or less; $R_r$ 103 is the surface leakage resistance, which is ordinarily very large, being in the order of many megohms; and, $R_z$ 101 is the diffusion resistance, also known as the incremental barrier resistance, which varies with current and temperature. I 107 is the total diode current; V 108 is the total diode voltage; $I_z$ 105 is the current through the diffusion resistance; and, $I_r$ is the current through the surface leakage resistance. Since $R_r$ 103 is much larger than $R_z$ 101 in the forward conducting region, the current $I_r$ 106 will be very small compared to $I_z$ 105. And, for all reasonably small values of forward current, the ohmic resistance, $R_o$ 102, will have a negligible portion of the applied voltage across its terminals. Then, $R_z$ 101 will be the all important aspect of the diode in this operating region.

The relationship between voltage and current for $R_z$ is given by the following equation:

$$I = I_s(e^{Vq/kT} - 1) \qquad \text{(Equation 1)}$$

where, in the above Equation 1, I is the current in amperes; $I_s$ is the saturation current of the diode in amperes; V is the diode voltage in volts; q is the charge on the electron, or $$q = 1.59201 \times 10^{-19} \text{ coulombs} \qquad \text{(Equation 2)}$$

k is Boltzmann's constant, or $$k = 1.38044 \times 10^{-23} \text{ joules/degree Kelvin} \qquad \text{(Equation 3)}$$

and, T is the absolute temperature of the diode in degrees Kelvin. The actual value of the saturation current is not important here, since impedance is only of concern. Impedance will be found from differentiation of Equation 1 with respect to V and inverting.

$$1/R_z = dI/dV = I_s(q/kT)e^{Vq/kT} \qquad \text{(Equation 4)}$$

Substituting Equation 1 into the above expression, and inverting produces:

$$R_z = dV/dI = (kT/Iq)\{e^{Vq/kT} - 1\} \cdot \{e^{Vq/kT}\}^{-1} \qquad \text{(Equation 5)}$$

The above expression, Equation 5, illustrates mathematically the essential operation of a diode. For example, at ordinary room temperature of 300° Kelvin (approximately 80° Fahrenheit, the value of $kT/q$ is .02613 volt; and the impressed voltage to achieve reasonable forward conduction is on the order of .2 to .6 volt. Thus, since the impressed voltage is much larger than $kT/q$, or $$V \gg kt/q \qquad \text{(Equation 6)}$$

the exponential term, $e^{Vq/kT}$ will be much larger, by many orders of magnitude, than 1. Therefore, the expression for impedance in the forward region becomes very nearly as follows:

$$R_z = kT/Iq \qquad \text{(Equation 7)}$$

The above Equation 7 expresses the relationship between impedance, temperature and current, for any diode in its low current forward conduction region, and is essentially invariant to materials employed or the structural details of the diode. For example, at 300° Kelvin, and .001 ampere (1 milliampere), $$R_z = 26.0 \text{ ohms} \qquad \text{(Equation 8)}$$

At 300° Kelvin and .0001 ampere (100 microamperes), $$R_z = 260 \text{ ohms} \qquad \text{(Equation 9)}$$

and, at 200° Kelvin and .00001 ampere (10 microamperes), $$R_z = 1{,}733 \text{ ohms} \qquad \text{(Equation 10)}$$

For ten diodes in series, the above numbers would be simply multiplied by ten.

Figure 2:
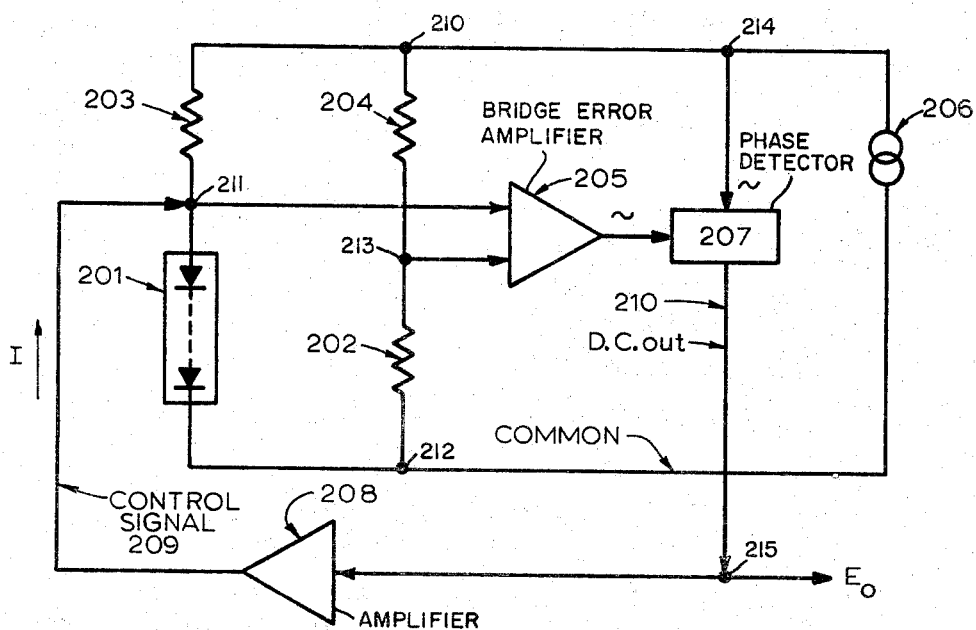
FIGURE 2 shows a block diagram of a temperature measuring system in accordance with this invention.

Reference is made to FIGURE 2. Here a string of one or more diodes in series is arranged in a bridge to compare the diode 201 impedance to a fixed resistance 202. Resistances 203 and 204 serve as the remaining arms of the bridge; of course the arms of the bridge may be comprised of any number of other impedance elements such as capacitances or inductances or any number of different types of bridge elements as normally found in balanced electronic bridge circuits. An alternating current signal source 206 energizes the bridge. This alternating current signal source, which may be anywhere in the audio frequency range, has of course an amplitude which is lower than that which will cause forward conduction of the diode 201. If a large alternating current signal were used, then the diode would rectify the signal and not permit the invention to operate. The bridge circuit will be further defined at this point to designate terminal 210 as a first terminal of the bridge circuit and resistance elements 203, 204 as first and second arms, respectively, of the bridge circuit.

Terminal 212 of the bridge circuit will be termed the second terminal and the resistance 202 and the diode string 201 will be referred to as the third and fourth arms of the bridge circuit. Finally, terminals 211 and 213 will be termed the third and fourth terminals of the bridge circuit. It will be appreciated that at the instant the alternating current source 206 is turned on the bridge circuit will function in the following manner. At the instant the alternating current source is applied, the diode string 201 will appear as an open circuit and the instantaneous voltage at terminal 211 will equal that which is at terminal 210 while the instantaneous voltage at terminal 213 will reflect a voltage drop due to resistance 204. This will therefore produce an instantaneous bridge error which will be detected by a bridge error amplifier 205 which will deliver an alternating current signal to phase detector 207. The phase detector 207 is electrically connected to the alternating current signal source at terminal 214. This connection provides the phase detector 207 with a reference signal against which the alternating current signal from the bridge error amplifier may be measured. The difference in the amplitude of the alternating current signals received by the phase detector 207 results in a D.C. signal out of the phase detector 207 over lead 210, which D.C. signal has a voltage level directly proportional to the temperature of the environment surrounding the diode string 201 for the reasons which follow.

The D.C. signal output on lead 210 is electrically coupled to a terminal 215, which terminal 215 has shown an output $E_o$ delivered to the right, which output can be used to drive a calibrated voltage measuring unit not shown. This output $E_o$ may be used in a variety of ways, all of which form no part of the instant invention. There follows now a brief review and a continued explanation. The bridge error is amplified by the amplifier 205; and the amplified error signal is phase detected at 207. The phase detected output 210 is electrically coupled to a conventional current amplifier 208 which generates a D.C. current 209 which passes through the diodes and is used to adjust the diode string 201 for constant impedance, by nulling the bridge. The current I 209 through the diode string 201 is automatically adjusted by virtue of the feedback system to maintain constant impedance at any temperature. Since temperature and current are linearly related, the value of the D.C. current 209 will be proportional to the absolute temperature, as given by Equation 7; this equation is rearranged as follows:

$$I = kT/R_z q \quad \text{(Equation 11)}$$

In the above Equation 11, $k$, $R_z$, and $q$ are constants and temperature and current are thereby linearly related, being directly proportional. Thus we see in the example embodiment in FIGURE 2 that we have a feedback system which causes a D.C. current to pass through a string of one or more diodes which are each in their forward conducting region, so that the impedance of the diode string will be maintained at a constant impedance level regardless of the temperature; and, since the temperature and current of the included diodes are mathematically related by physical constants, we have a very accurate method of determining the temperature of the diode string. The diodes may be very tiny or they may be very large; and since the units are operated in the forward conduction region, we are assured that the temperature measuring system hereby obtained will be quite accurate and linear over many decades. Limitations will be of course the lowest and highest temperatures which the diodes can withstand. The lowest temperature is usually limited by the mechanical structure of the diodes, and shrinkage of elements comprising the diode junction and the interconnections to the semiconductor portions. The highest temperature is usually dependent upon the temperature of chemical decomposure of the materials employed.

Figure 3:
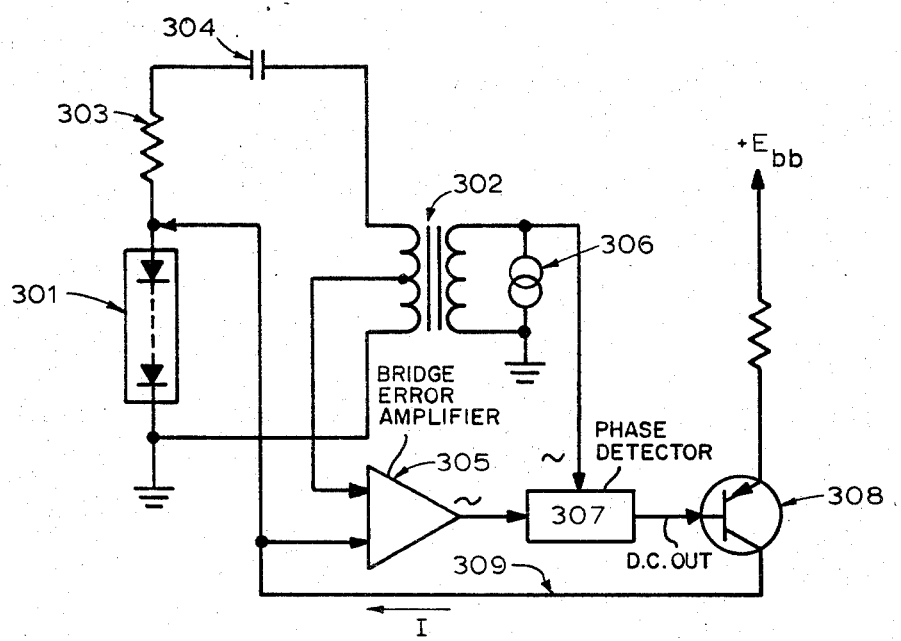
FIGURE 3 shows a typical absolute temperature measuring system in accordance with this invention.

Many different arrangements and changes can be made in design without departing from the spirit and scope of the invention. For example, FIGURE 3 illustrates a typical absolute temperature measuring system in accordance with this invention. This system is similar to the example embodiment in FIGURE 2 except that the bridge is comprised of a tapped transformer rather than two arms. In FIGURE 3, a diode string comprised of one or more diodes 301 is included in a bridge circuit comprised of a comparison impedance 303, a capacitor 304, and a center-tapped transformer 302. The capacitor 304 serves to isolate the control current I 309 flowing through the diode string from the alternating current signal in the bridge. Changes in said control current cause the diode string to have corresponding changes in impedance. The current at which the comparison impedance is equal to the value of impedance of the diode string 301, a null condition will occur at the amplifier. The amplifier 305 drives a phase sensitive detector 307 referenced by the A.C. signal source 306. The D.C. output 310 of the phase sensitive detector drives the base of the transistor 308. The collector current of the transistor 309 is used to adjust the currents in the diode string, thereby completing a complete feedback loop.

Figure 4:
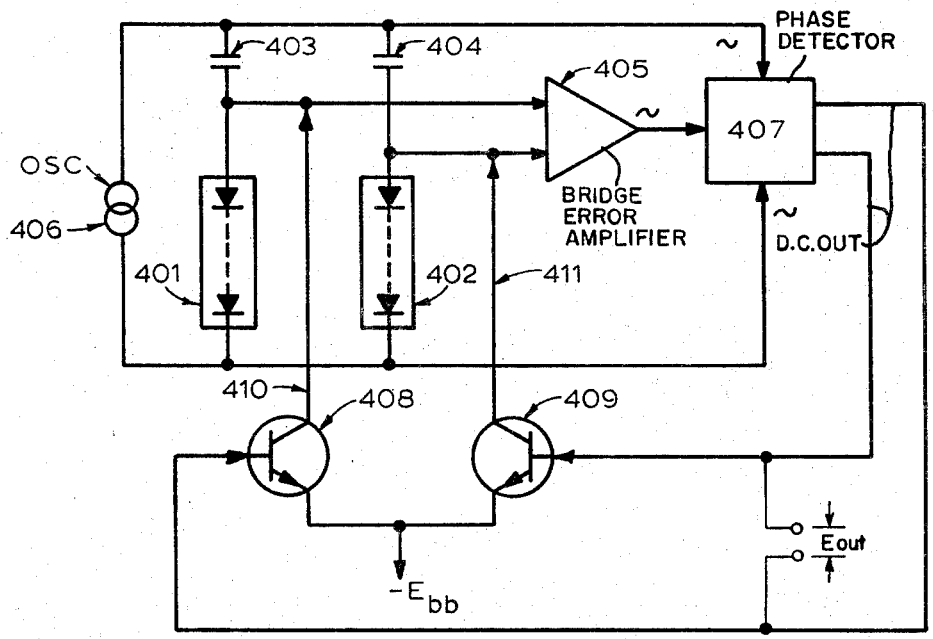
FIGURE 4 shows a typical differential or referenced temperature measuring system in accordance with this invention.

To further illustrate the wide application of this invention, another example embodiment is shown in FIGURE 4. With reference to FIGURE 4 a typical differential or reference temperature measuring system in accordance with this invention is illustrated. In FIGURE 4, two identical diode strings 401 and 402 are arranged so that control currents 410 and 411 will flow through them. A pair of differentially operated transistors 408 and 409 is used for constant current sources to apply the control currents 410 and 411 through the diode strings 401 and 402; of course other means could be used to supply the control currents. A bridge is made up comprised of the two diode strings 401 and 402 and two capacitances 403 and 404. The bridge is driven from an alternating current signal source 406. The unbalanced signal across the bridge is amplified at the amplifier 405 and applied to a phase sensitive detector 407. The phase sensitive detector 407 is referenced to the same alternating current signal source 406 which drives the bridge. In the event that any temperature difference occurs across the two diode strings, the feedback system will cause a differential error signal at $E_{out}$. This error signal is amplified through the control transistors 408 and 409 and adjusts the currents through the diode strings automatically. Thus, the signal at $E_{out}$ is an exact replica of the temperature unbalance between the diode strings 401 and 402.

It is to be noted that various modifications can be made in each embodiment of the temperature measuring system without departing from the scope of the invention. For example: The bridge may be substituted for any ordinary impedance measuring circuit; the bridge elements may be interchanged for various impedances; various frequencies of oscillators may be used; and, various other feedback arrangements may be employed. The invention is therefore not limited to the specific configurations shown, and for example, embraces the method and means for achieving exact temperature measurements based upon physical constants. Therefore it is to be understood that the particular embodiments described above and shown in the drawings are merely illustrative of and not restrictive on the broad invention, and that various changes in design, structure, and arrangement may be made without departing from the spirit and scope of the appended claims.

I claim:

1. In a temperature measuring system employing at least one solid state semiconductor diode means having a predetermined junction resistance which varies with current and temperature,
  a bridge circuit network having a first terminal joining first and second arms of said bridge circuit and a second terminal joining third and fourth arms of said bridge circuit, third and fourth terminals joining said first and fourth arms and said second and third arms respectively,
  said semiconductor diode means included in said fourth arm of said bridge circuit,
  said bridge circuit having impressed across said bridge circuit at said first and second terminals a low frequency alternating current signal of an amplitude lower than that which will cause forward conduction of said diode means,
  a bridge error amplifier connected across said third and fourth terminals of said bridge circuit and having an alternating current output indicative of the unbalance of said bridge,
  a phase detector having as a reference signal input said low frequency alternating current signal,
  said alternating current output from said bridge error amplifier is fed to said phase detector,
  said phase detector having a D.C. output which varies as a function of the difference in amplitude between said low frequency alternating current reference signal and said bridge error amplifier alternating current output,
  the voltage of said varying D.C. output having a direct relationship to the change in temperature of said semiconductor diode, thereby providing a useable output to measure temperature,
  said varying D.C. output is serially coupled through a current amplifier to said third terminal of said bridge circuit to provide a feedback current to pass through said semiconductor diode means to place said bridge circuit in balance, said feedback current from said current amplifier being proportional to the voltage of said varying D.C. output from said phase detector.

2. The temperature measuring system of claim 1 wherein said solid state semiconductor diode means includes a plurality of serially connected diodes.

3. The temperature measuring system of claim 2 which includes an alternating current signal source electrically coupled to said first and second terminals of said bridge circuit.

4. In a temperature measuring system employing at least one solid state semiconductor diode means having a predetermined junction resistance which varies with current and temperature,
  a bridge circuit network having a terminal and at least two arms of a bridge electrically coupled to said terminal,
  said semiconductor diode means included in one of said bridge arms and a comparison impedance in said other arm,
  an alternating current signal source means impressed across both of said arms of said bridge, said alternating current signal source means producing a signal having an amplitude lower than that which will cause forward conduction of said diode means,
  a bridge error amplifier connected between said terminal and said alternating current signal source means and having an alternating current output indicative of the unbalance of said bridge,
  a phase detector having as a reference signal input said low frequency alternating current signal,
  said alternating current output from said bridge error amplifier electrically coupled to said phase detector,
  said phase detector having a D.C. output which varies as a function of the difference in amplitude between said low frequency alternating current reference signal and said bridge error amplifier alternating current output,
  the voltage of said varying D.C. output having a direct relationship to the change in temperature of said semiconductor diode, thereby providing a useable output to measure temperature,
  said varying D.C. output is serially electrically coupled through a current amplifier to said terminal of said bridge circuit to provide a feedback current to pass through said semiconductor diode means to place said bridge circuit in balance, said feedback current from said current amplifier being proportional to the voltage of said varying D.C. output from said phase detector.

5. The temperature measuring system of claim 4 wherein said alternating current signal source means includes a tapped transformer having a primary winding and a tapped secondary winding, an alternating current signal source electrically coupled across said primary winding, said secondary winding electrically coupled across said bridge arms and said center tap electrically coupled to said bridge error amplifier.

6. In a temperature measuring system employing at least two solid state semiconductor diode means having predetermined junction resistance which varies with current and temperature,
  a bridge circuit network having four terminals and four bridge arms, two adjacent arms of said bridge circuit having capacitance means included therein and the remaining two arms having said semiconductor diode means included therein,
  an alternating current signal source impressed across a pair of arms of said bridge, one of said arms including said capacitance means and the other arm of said pair including said semiconductor diode means, said alternating current signal source producing a signal having an amplitude lower than that which will cause forward conduction of said diode means,
  a bridge error amplifier connected across the two arms of said bridge which include said semiconductor diode means, and having an alternating current output indicative of the unbalance of said bridge,
  a phase detector having as a reference signal input said low frequency alternating current signal,
  said alternating current output from said bridge error amplifier electrically coupled to said phase detector,
  said phase detector having a pair of D.C. outputs which outputs vary as a function of the difference in amplitude between said low frequency alternating current reference signal and the bridge error amplifier alternating current output,
  the difference in voltage between said pair of D.C. outputs having a direct relationship to the change in temperature of said semiconductor diodes, thereby providing a useable output to measure temperature,
  said varying D.C. outputs from said phase detector are electrically coupled to a current amplifier means, said current amplifier means being electrically coupled across said arms of said bridge which include said semiconductor diode means to provide a feedback current to pass through said semiconductor diode means to place said bridge circuit in balance, said feedback current from said current amplifier being proportional to the voltage of said varying D.C. outputs from said phase detector.

References Cited

UNITED STATES PATENTS

| | | | |
|---|---|---|---|
| 3,315,153 | 4/1967 | Whatley | 323—75 |
| 3,349,321 | 10/1967 | Arksey | 323—75 |
| 3,350,943 | 11/1967 | Smith | 73—362 |
| 2,016,660 | 10/1935 | Weeks | 73—362 |
| 3,088,319 | 5/1963 | Neumayer | 73—362 |
| 3,092,998 | 6/1963 | Barton | 73—362 |
| 3,096,650 | 7/1963 | Lowenstein et al. | 73—362 |
| 3,330,158 | 7/1967 | Simonyan et al. | 73—362 |

LOUIS R. PRINCE, *Primary Examiner.*

FREDERICK SHOON, *Assistant Examiner.*

U.S. Cl. X.R.

307—310; 323—75